(12) United States Patent
Griessbach et al.

(10) Patent No.: US 6,898,656 B2
(45) Date of Patent: May 24, 2005

(54) DATA BUS FOR SEVERAL USERS

(75) Inventors: Robert Griessbach, Weyarn (DE); Martin Peller, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 177 days.

(21) Appl. No.: 10/114,325

(22) Filed: Apr. 3, 2002

(65) Prior Publication Data
US 2002/0166014 A1 Nov. 7, 2002

Related U.S. Application Data

(63) Continuation of application No. PCT/EP00/08786, filed on Sep. 8, 2000.

(30) Foreign Application Priority Data

Oct. 4, 1999 (DE) .......................................... 199 47 658

(51) Int. Cl.⁷ .............................................. G06F 13/14
(52) U.S. Cl. ............................ 710/305; 714/2; 713/375
(58) Field of Search ................................ 710/305, 306, 710/300–304, 313, 314, 62, 63, 107; 709/208, 209, 210, 211; 714/2, 10–12, 55, 23; 713/375, 400, 500

(56) References Cited

U.S. PATENT DOCUMENTS

| 5,373,537 A | * 12/1994 | Oberhauser et al. ........ 375/357 |
| 5,577,075 A | 11/1996 | Cotton et al. |
| 6,049,893 A | * 4/2000 | Liddell et al. ................ 714/23 |
| 6,141,769 A | * 10/2000 | Petivan et al. ................ 714/10 |
| 6,173,023 B1 | * 1/2001 | Tanonaka et al. ........... 375/357 |
| 6,631,483 B1 | * 10/2003 | Parrish ........................ 714/55 |

FOREIGN PATENT DOCUMENTS

| DE | 19509534 | 2/1997 |
| DE | 19720401 | 3/1998 |
| EP | 0583716 | 2/1994 |
| EP | 0784393 | 10/1999 |

* cited by examiner

Primary Examiner—Sumati Lefkowitz
Assistant Examiner—Clifford Knoll
(74) Attorney, Agent, or Firm—Crowell & Moring LLP

(57) ABSTRACT

In the case of a data bus for several users, the users have hierarchical transmission authorizations; the users are synchronized by a synchronization signal; and the communication of the user with the highest priority, which can be emitted at regular time intervals by this user, serves as a synchronization signal.

8 Claims, 5 Drawing Sheets

DATA BUS FOR SEVERAL USERS

CROSS-REFERENCE TO RELATED APPLICATIONS

This application is a continuation of PCT Application No. PCT/EP00/08786 filed Sep. 8, 2000.

This application is related to copending applications entitled "Operating Method for a Data Bus for Several Users With Flexible Timed Access", U.S. Ser. No. 10/114,316; "Operating Method for Two Data Buses", U.S. Ser. No. 10/114,317; and "Operating Method for a Data Bus", U.S. Ser. No. 10/114,331, filed on even date herewith.

BACKGROUND AND SUMMARY OF THE INVENTION

The invention relates to a data bus provided for several users.

A data bus of this type is described in German patent document DE 19720401 A. The specification of the German patent document DE 19720401 A is as follows.

Databuses of this type are used more and more frequently. For example, in the case of buildings, they have the purpose of mutually connecting the various electric switches, power absorbers and the like of a building with respect to circuit engineering and of transmitting control commands of the users among one another. Additional applications are the networking of machine controls in the industrial field; for example, for a production line, databuses in airplanes for the various driving and control components as well as land craft with the corresponding devices for the switching, converting and consuming of electric power.

There are two different embodiments of databuses. One embodiment represents the synchronized type, in which a bus master emits a synchronization pulse with a defined clock frequency. Within the time interval between two different clock pulses, the users of the databus access the data bus within a defined time window. As a rule, the point in time of their respective transmission authorization is determined by their transmission priority and each user transmits within a defined time window after the emission of the synchronization pulse.

Such a databus has the advantage of being able to operate within any type of collisions of users, since each user is provided with a defined time window for the user's transmission. On the other hand, such a databus is relatively slow because the cycle time is determined by the number of users and because, particularly in the case of a large number of users, this results in a low clock rate. In addition, it is difficult to supply by means of one and the same data bus concept not only a defined number of users but also a number of users which deviates therefrom. Time windows are therefore also supplied for users who may be present only in a maximal case, with the result of a corresponding reduction of the clock rate.

The second databus concept is known as an asynchronous databus. In that case, the users access the databus corresponding to their hierarchy-caused transmission authorization. This has the result that the highest-priority user can access the databus at any time, but has the disadvantage that this user may "clog" the databus; that is, lower-priority users no longer have the possibility of accessing the databus. In addition, there is the problem of the collision of users because, as a result of the signal transit times, several users can simultaneously start transmitting on the apparently free databus and experience the transmission of another user only during their transmission. This requires high-expenditure collision avoidance strategies, such as CSMA/CD.

The databus according to DE 19720401 A has characteristics of the synchronous as well as of the asynchronous data bus. The synchronization pulse is an unambiguous characteristic of the synchronous databus. The indicated cycle time can be found neither in the case of an asynchronous nor in the case of a synchronous databus. The time interval is between the transmission duration of the highest-priority transmission time and the cumulative transmission time of all users. In the case of a databus with 100 users, this time interval is selected, for example, such that the 50 highest-priority users can all access the databus within a cycle time, while in this case the lower-priority user will no longer access the databus.

The number 50, that is, approximately half of the maximally present users is to be understood only as a reference point. In the respective application case, it may also be between 2 and, for example, 95 users. It is only important that the cycle time is in fact significantly shorter than the cumulative transmission time of all users. It is therefore never possible to permit all users to transmit on the databus within one cycle. On the other hand, the addressed problem of the supplying of time windows for possibly non-existing bus users is thereby eliminated, and a cycle time is reached which corresponds to the respective requirements.

By the placing of a hierarchical transmission authorization, the collision prevention algorithms typical in the case of an asynchronous databus become superfluous. At the same time, as a result of the selection of the transmission time for the user who is, in each case, next in the hierarchy, in the case of a non-transmission of the preceding user, it is ensured in the indicated manner that only the actually transmitting users access the databus, and the users who do not use the databus for their transmission within the cycle are taken into account only in that it is ensured that they are actually not transmitting. This is achieved while taking into account the signal transit times within the databus.

The basic principle of DE 197 20 401 A can be described as follows:

In principle, each user is enabled to access the databus with the user's transmission. However, the user is subjected to the hierarchy. The user's transmission point in time within in the cycle is the later, the lower the user's hierarchical position. If the user's transmission point in time is after the expiration of the cycle, the user cannot transmit before the next cycle. If then the corresponding number of higher-priority users are transmitting again, the user can also not transmit then, etc. The user's ability to transmit therefore depends on how many higher-priority users are transmitting in each transmission cycle.

The cycle time is dimensioned according to how many users in each cycle have to be given the transmitting possibility. The cycle time is dimensioned for the number of these preferred users. Whether the other users can now actually transmit during a cycle depends on how many of the preferred users actually do (not) transmit and how many of the higher-priority other users are transmitting.

During a user's transmission, it may occur that the transmission end coincides with the transmission point in time of the synchronous pulse, that is, with the cycle end, or even follows it. The invention offers different solutions for this purpose. One solution consists of delaying the output of the synchronization pulse until the user has concluded the user's transmission.

In order to nevertheless be able to maintain the clock frequency, the output time of the subsequent synchronization pulse is dimensioned such that it is synchronized with the preceding next-to-the-last synchronization pulse. If the preceding, next-to-the-last synchronization pulse is called the first pulse and the subsequent pulses are called the second, third, etc. pulse, the time interval between the first and the second pulse is greater than the cycle time, while the time interval between the second and the third pulse is shorter than the cycle time. If, during the output of the third synchronization pulse, a user is again transmitting on the databus, also the third synchronization pulse is emitted in a delayed manner. The subsequent synchronization pulse, that is, here the fourth synchronization pulse, will then compensate the exceeding of the time, etc.

An alternative solution provides that the user does not transmit when the end of the user's transmission coincides with the end of the cycle or is even later. This results in the advantage of an always constant cycle time. Corrections, as in the case of the first solution alternative, can then be omitted.

The databus of FIGS. 3 and 4 consists essentially of a single light waveguide (in the form of a light waveguide fiber). The individual users T are mutually connected by way of the fiber as well as by way of an active star coupler.

In each user, a transmission/reception module S/E is provided for the connection to the light waveguide bus, into which transmission/reception module a transmission and reception diode as well as a beam splitter lens system is integrated (not shown). The light waveguide path formed by the light waveguide fiber is operated in a bidirectional manner. The active star coupler consists essentially of the transmission/reception modules. One transmission/reception module is present for each user. The modules are wired in the star coupler such that the message transmitted by a user is distributed to all other branches of the bus system. These branches are essentially formed by the transmission/reception modules of the star coupler as well as, corresponding therewith, the transmission/reception modules of the respective users.

The telegrams going out on the bus from the respective transmitting user and transmitted to the other users characterize conditions or measuring values of sensor as a part of the users. In addition, actuators, such as air bags and belt tightening devices, are connected to the bus system as additional users. The actuators detect the telegrams supplied by the sensors and, each separately, compute the required actions. Simultaneously, a possibly critical condition in a user is detected by the bus master and is answered by the output of an initialization pulse to the bus, which, with respect to its length, differs from the initialization pulse otherwise emitted by the bus master.

One of the users acts as the bus master. For this purpose, the user marked $T_M$ could be used. This user sends out a synchronization pulse at regular time intervals, as illustrated in the diagram of FIG. 4. The users receive the transmission authorization with a defined transmission priority. When the respective user is in a condition which is not critical with respect to safety, the user, as a rule, does not transmit. "As a rule" means in this case that this is not the initialization operation during which, after the start of the operation of the vehicle, the users identify themselves to the other users and to the bus master by emitting an identification. However, the users check in cyclically at relatively long intervals of several cycles unless they start a transmission, and emit a brief signal indicating their presence.

If the condition is not critical with respect to safety, that is, if the users in their entirety are not transmitting, the next synchronization pulse is emitted by the bus master after the expiration of the cycle time.

In a condition which is critical with respect to safety and in which, for example, the bus user with the highest transmission priority is activated, the databus is first engaged by its telegram $t_1$. The user with the next transmission priority is then, for example, also transmitting and emits the telegram $t_2$. A corresponding situation applies to the user with the telegram $t_3$. As known per se from German Patent Document DE 34 35 216 A, each telegram $t_i$ has an identification by which the other users can identify and optionally record the telegram. It is also possible to emit telegrams to the databus which contain the address of a recipient and are intended for this recipient. After the expiration of the cycle time and if no user is transmitting up to this point in time, the next synchronization pulse s is emitted.

If, in contrast, a user is transmitting when the cycle time is expiring, the output of the synchronization pulse is delayed. This case is illustrated in the time period indicated as cycle 2. In this case, the delay $t\_{vo}$ has to be shorter than the time interval $t\_{wx}$ which exists between the transmissions of successive users.

The subsequent synchronization pulse—here, $s_3$—is synchronized with the first synchronization pulse $s_0$ emitted at the start of cycle 1 and with the synchronization pulse $s_1$. The time interval between synchronization pulse $s_2$ and $s_3$ is shorter than the cycle time.

The databus, which is not shown in detail and whose telegram traffic is illustrated in FIG. 5, basically has the same construction as the databus of FIG. 3. Here also, the next synchronization pulse s is emitted after the expiration of the cycle time $t\_{zyk}$.

If a user were to still transmit after the expiration of the cycle time $t\_{zyk}$, the transmission of this user would be prevented in this case. For this purpose, each user computes the (actual) time available to that user within the cycle time for the user's transmission and omits the transmission if its transmission duration $t_1, t_2, t_3$ is not at least by the value $t\_{wx}$ before the expiration of the cycle time $t\_{zyk}$. The value $t\_{wx}$ essentially represents the maximal signal transit time within the databus.

FIGS. 4 and 5 illustrate additional characteristics of the databus. In cycle 2, the users $T_1$, $T_4$ and $T_8$ are assumed to be active transmitters. The transmission point in time is measured after the end of the transmission of the user preceding according to the hierarchy and the own hierarchical position. In the case of successive hierarchical positions of two transmitters, the time interval is minimal and equal to $t_{wx}$. The time interval of two transmitters increases with their hierarchical distance. The interval between $t_1$ and $t_4$ is therefore greater than the interval between $t_1$ and $t_2$ and smaller than the interval between $t_4$ and $t_8$. In this manner, it becomes possible for each user to transmit as required if the user has a transmission authorization within the cycle time. On the other hand, the user will transmit only when an actual emergency is occurring. The transmission point in time is nevertheless precisely defined. As a result, collisions are prevented. The transmission point in time of each user is the earliest possible.

In the event of an alarm, the duration of the synchronization pulse is extended. This results in a protection against a faulty triggering of the safety device. It will be triggered only when, as a result of the (extended) synchronization pulse ($t\_{syn\_b}$ instead of $t\_{syn_a}$) a critical condition is signalled and it additionally receives a corresponding telegram of a crash sensor. In the event of a crash, the safety device therefore does not trigger in the cycle in which the telegram of the crash sensor appears for the first time but in the subsequent cycle at whose start a critical condition of the overall system is signalled by the extended synchronization pulse and the actual danger is indicated by the continuously transmitting crash sensor.

Furthermore, the possibility exists in the case of these databuses of engaging them outside the event of an alarm by users which are assigned to devices which are not critical with respect to safety. These devices may, for example, be arranged in a vehicle door and be used for moving the window, the outside mirror or for the heating of the door lock. A prerequisite is only a priority which is lower than that of the devices critical with respect to safety, in order not to interfere with their operation in the event of an alarm.

In this manner, it becomes possible for the first time to cause devices relevant to the occupant safety of the vehicle users to communicate by way of a databus.

Communication transmissions on the known data bus are synchronized. A bus master emits a synchronization pulse at a defined clock frequency. Within the time period between the successive clock pulses, the users of the data bus access the data bus within a defined time window or at a defined point in time. As described in the above-mentioned German patent document, this point in time can also be variable and depend on the transmission priority and on the extent to which the data bus was utilized by communications of a higher-hierarchy.

Problems may arise, however, if the clock pulse generator fails. The connection of an equivalent or redundant clock pulse generator results in high expenditures and problems because, as a rule, a certain time is required for activating the equivalent clock pulse generator during which the bus communication may possibly be interrupted or at least be subjected to interference.

It is an object of the present invention to provide a data bus of the above-mentioned type, which ensures a virtually uninterrupted bus communication even in the event of a failure of the clock pulse generator.

The invention achieves this object by providing a data bus for several users, characterized in that the users possess hierarchical transmission authorizations; the users are synchronized by a synchronization signal; and the communication of the user with the highest priority, which can be emitted by this user at regular intervals, is used as the synchronization signal.

Other objects, advantages and novel features of the present invention will become apparent from the following detailed description of the invention when considered in conjunction with the accompanying drawings.

DETAILED DESCRIPTION OF THE DRAWINGS

Figure 1:
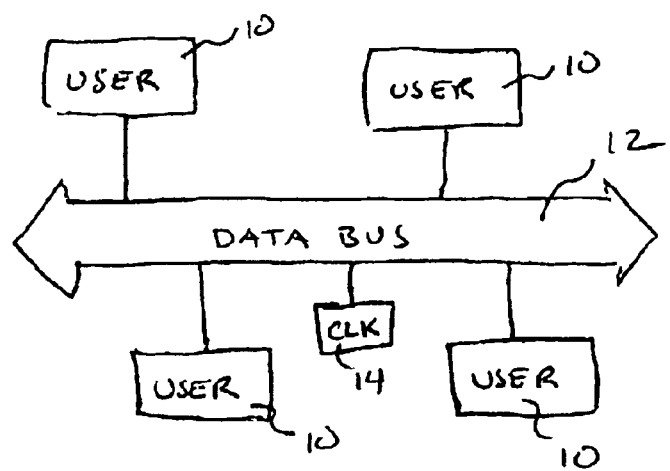
FIG. 1 is a schematic diagram of a data bus according to the invention.
Figure 2:
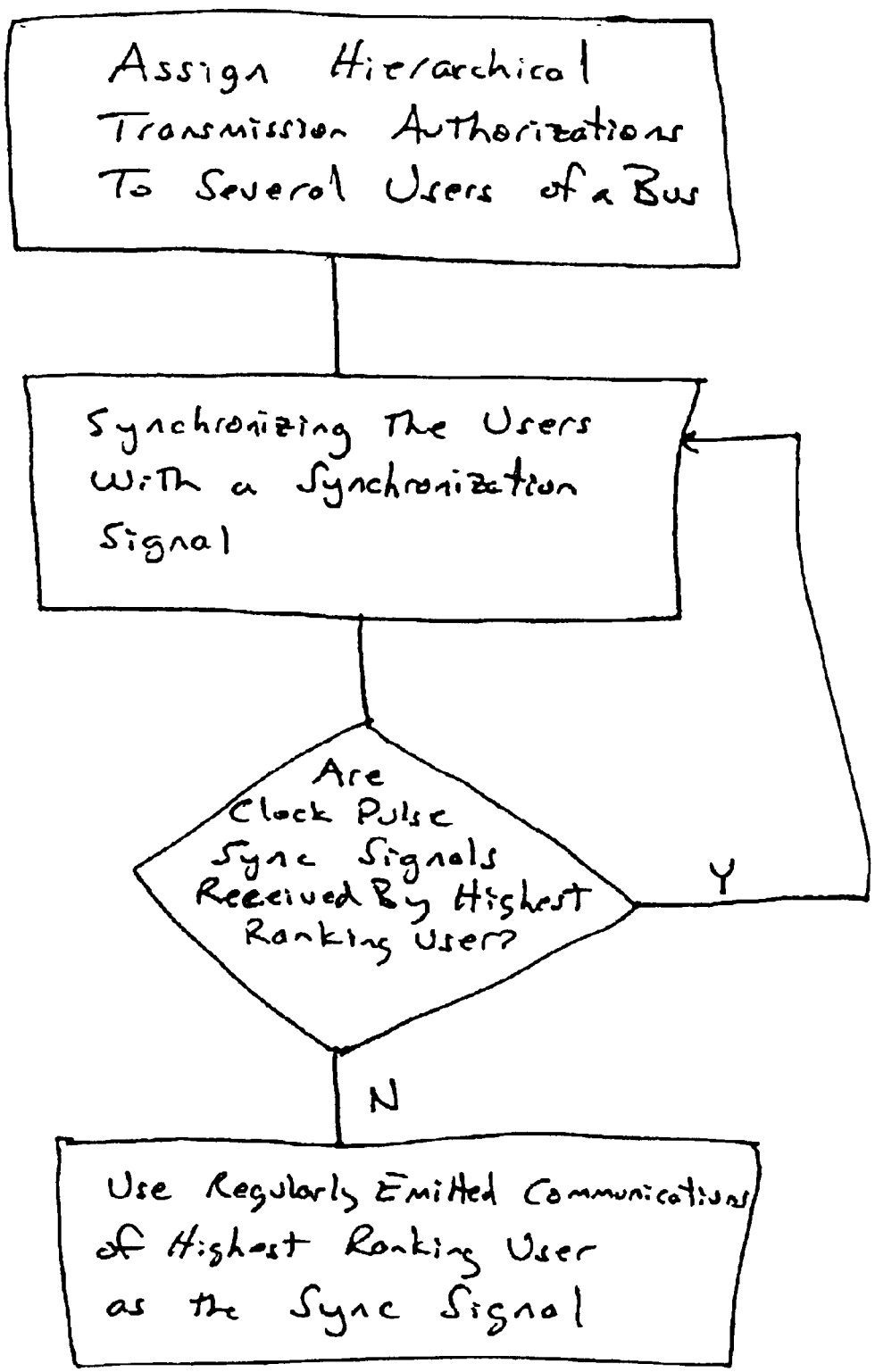
FIG. 2 is a flow chart of the clock operation of the bus.
Figure 3:
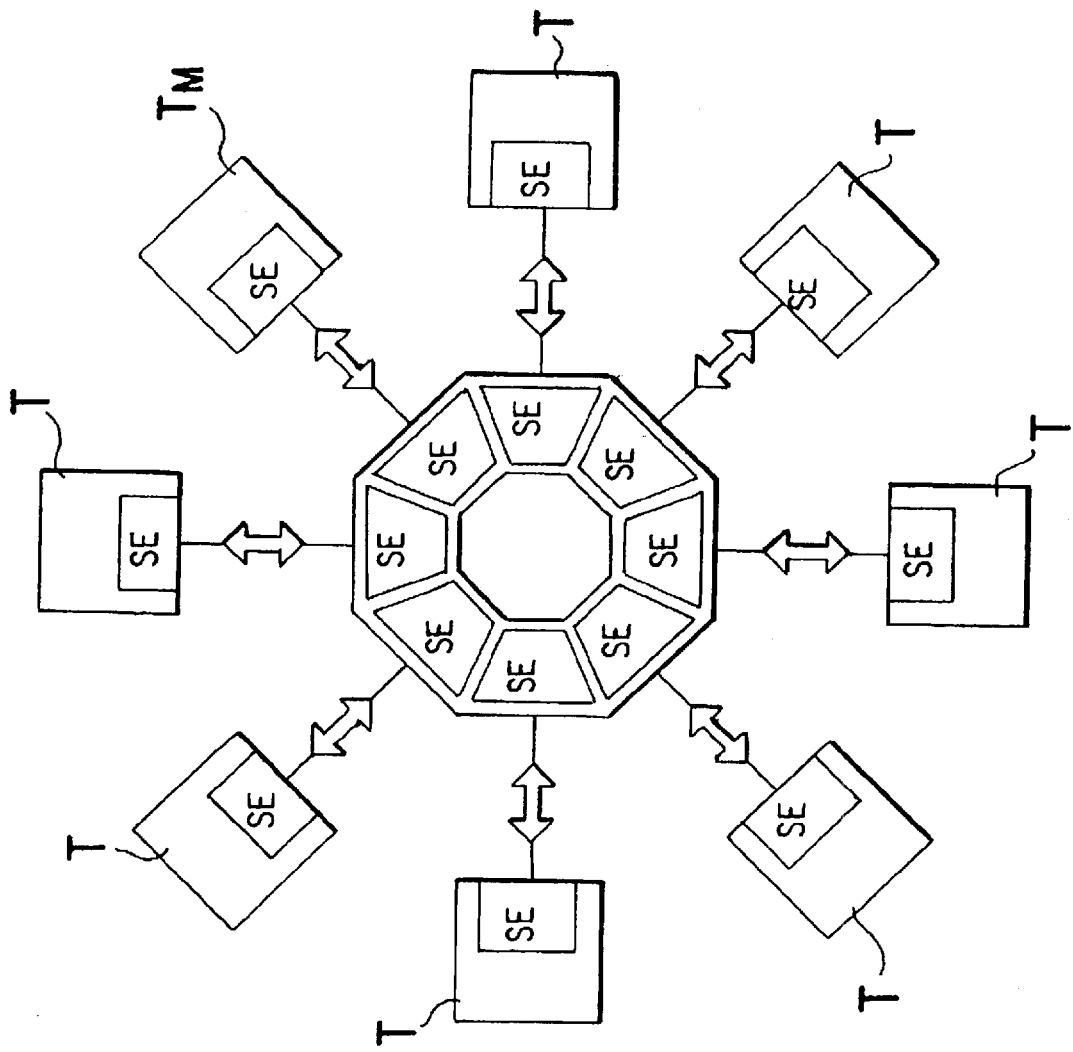
FIGS. 3–5 are prior art diagrams from DE 19720401 A.
Figure 4:
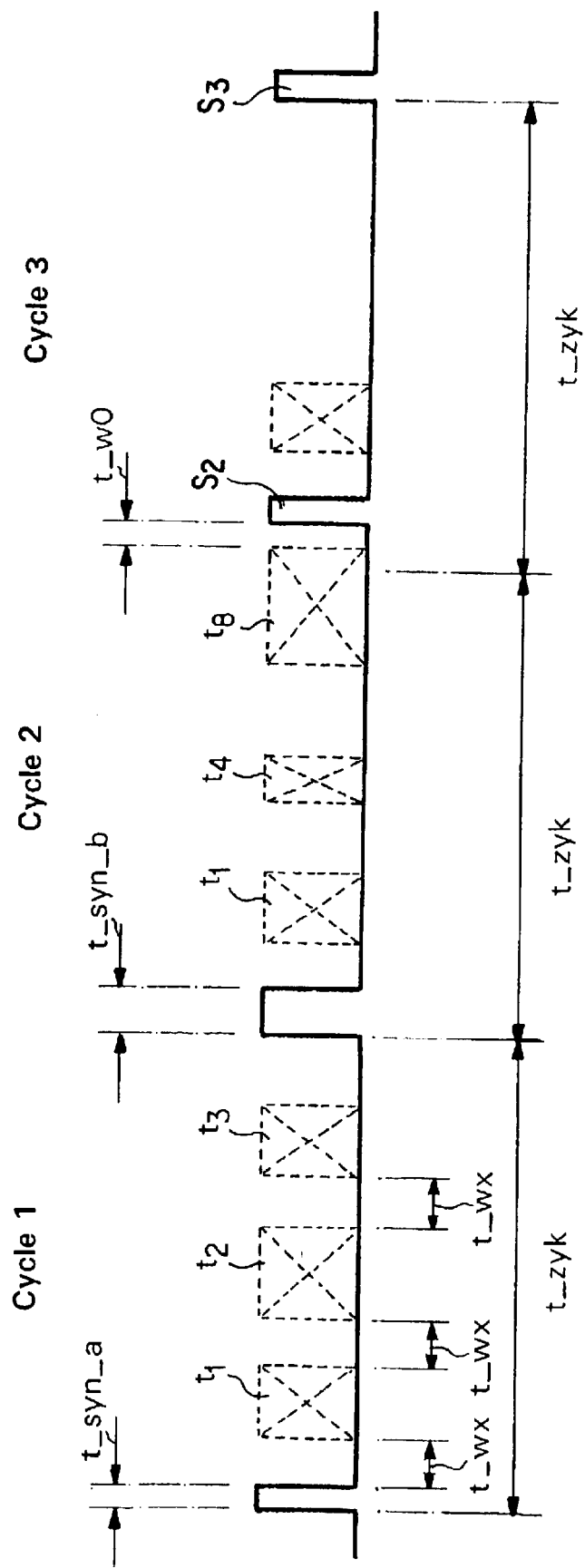
Figure 5:
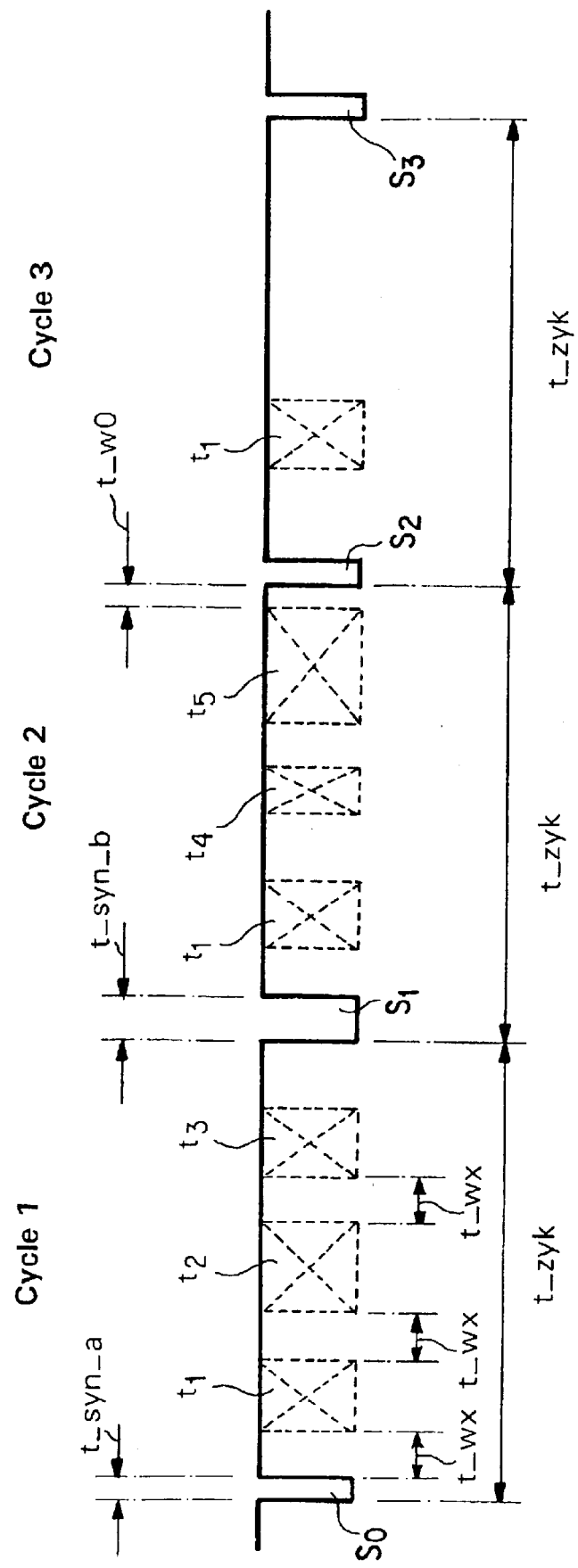

Referring to the figures, in the case of the data bus 12 according to the invention, the user 10 with the highest priority takes over the role of the clock pulse generator. In contrast to a pure clock pulse generator 14, which emits a clock pulse of a defined shape and/or duration and which is used only for the synchronization of the users, the user with the highest priority, which will then also operate as a clock pulse generator, has a dual function. This user continues to emits its communication, and the communication serves also as a quasi-clock pulse for the other users on the bus. The only prerequisite is that the user with the highest priority must be able to emit its communication at a time-constant spacing and the other users must recognize the communication of the user with the highest priority (in the following called highest-ranking user), particularly when the actual synchronization (clock) pulse fails, and accept it as the synchronization pulse.

In one embodiment when the actual synchronization (clock) pulse fails, the highest ranking user emits its communication at regular intervals only when its does not receive a synchronization signal normally emitted by a clock pulse generator. As in the case of the alternative operating mode, in which the highest ranking user transmits in each cycle also when the clock pulse generator is functioning, the highest ranking user can take up its transmission operation without an interruption of the data communication.

It is also contemplated to compensate for the failure of the clock pulse generator and of the highest ranking user without an interruption of the data communication. Here, the user with the second highest priority emits its communication at regular intervals when it receives neither a synchronization signal normally emitted by a clock pulse generator, nor the communication of the user with the highest priority.

As a result of the invention, the data bus will be fully operable even when the clock pulse generator fails. The invention also offers the possibility of completely eliminating a separate clock pulse generator if the highest ranking user accesses the data bus at regular time intervals.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Data bus for several users, wherein
   a) the users possess hierarchical data communication signal transmission authorizations,
   b) the users are synchronized by a synchronization signal, and
   c) the data communication signal of a user with the highest priority, which data communication signal the user emits at regular intervals, is used as the synchronization signal in place of a clock pulse generator synchronization signal.

2. Data bus according to claim 1, wherein the highest ranking user emits its data communication signal at regular intervals when it does not receive the clock pulse generator synchronization signal.

3. Data bus according to claim 1, wherein the user with the second highest priority emits its data communication signal at regular intervals when it does not receive the clock pulse generator synchronization signal, or the data communication signal of the user with the highest priority.

4. Data bus according to claim 2, wherein the user with the second highest priority emits its data communication signal at regular intervals when it does not receive the clock pulse generator synchronization signal, or the data communication signal of the user with the highest priority.

5. A method for operating a data bus on which several users are arranged, the method comprising the acts of:

assigning hierarchical data communication signal transmission authorization to the several users on the data bus;

synchronizing hierarchical transmission of the users via a synchronization signal; and using as the synchronization signal, the data communication signals of the user assigned a highest priority that is capable of transmitting said data communication signals at regular intervals in place of a clock pulse generator synchronization signal.

6. The method according to claim 5, wherein the act of using comprises the acts of:

determining whether a normal clock pulse generated synchronization signal is received by the highest ranking user; and transmitting data communication signals of the highest ranking user at regular intervals when the normal clock pulse generated synchronization signal is not received.

7. The method according to claim 5, further comprising the acts of:

transmitting data communication signals of the user with the second highest priority at regular intervals to form the synchronization signal when a normal clock pulse generated synchronization signal and data communication signals of the highest ranking user are not received.

8. The method according to claim 6, further comprising the acts of:

transmitting data communication signals of the user with the second highest priority at regular intervals to form the synchronization signal when a normal clock pulse generated synchronization signal and data communication signals of the highest ranking user are not received.

* * * * *